United States Patent
Elliott

(10) Patent No.: US 9,573,430 B2
(45) Date of Patent: Feb. 21, 2017

(54) ADJUSTABLE TRAILER HITCH SECURITY APPARATUS

(71) Applicant: Steven Craig Elliott, Lone Tree, CO (US)

(72) Inventor: Steven Craig Elliott, Lone Tree, CO (US)

(*) Notice: Subject to any disclaimer, the term of this patent is extended or adjusted under 35 U.S.C. 154(b) by 0 days.

(21) Appl. No.: 14/457,020

(22) Filed: Aug. 11, 2014

(65) Prior Publication Data

US 2016/0039259 A1 Feb. 11, 2016

(51) Int. Cl.
*B60D 1/60* (2006.01)
*B60D 1/46* (2006.01)

(52) U.S. Cl.
CPC ........ *B60D 1/60* (2013.01); *B60D 1/46* (2013.01)

(58) Field of Classification Search
CPC ........................................... B60D 1/60
USPC ............................. 280/432, 507, 511
See application file for complete search history.

(56) References Cited

U.S. PATENT DOCUMENTS

| 7,246,810 B2* | 7/2007 | Bussiere | B60D 1/60 280/507 |
| 7,559,570 B2* | 7/2009 | Cearns | B60D 1/52 280/490.1 |
| 7,909,350 B1* | 3/2011 | Landry | 280/479.2 |

* cited by examiner

*Primary Examiner* — Jacob Knutson
(74) *Attorney, Agent, or Firm* — Leyendecker & Lemire

(57) ABSTRACT

An adjustable trailer hitch security apparatus for use with an adjustable trailer hitch assembly to selectively cover the side holes of the hitch assembly's hitch mount, thereby preventing unauthorized access to the fastening system used to secure a trailer connection to the hitch mount comprises a moving cover portion connected to a fixed attachment portion. The cover portion is defined by a rectangular box shaped, hollow housing having an open elongated side opposite an elongated side wall and an open bottom side opposite an top side wall. The attachment portion is defined by a rectangular plate body having a top lip and a bottom lip, with a plurality of attachment apertures in its body. The cover portion is hinged to the attachment portion, enabling it to rotate from a open position to a closed position in which the cover portion and the attachment portion form a rectangular enclosure.

8 Claims, 10 Drawing Sheets

ADJUSTABLE TRAILER HITCH SECURITY APPARATUS

DETAILED DESCRIPTION OF THE INVENTION

Figure 1:
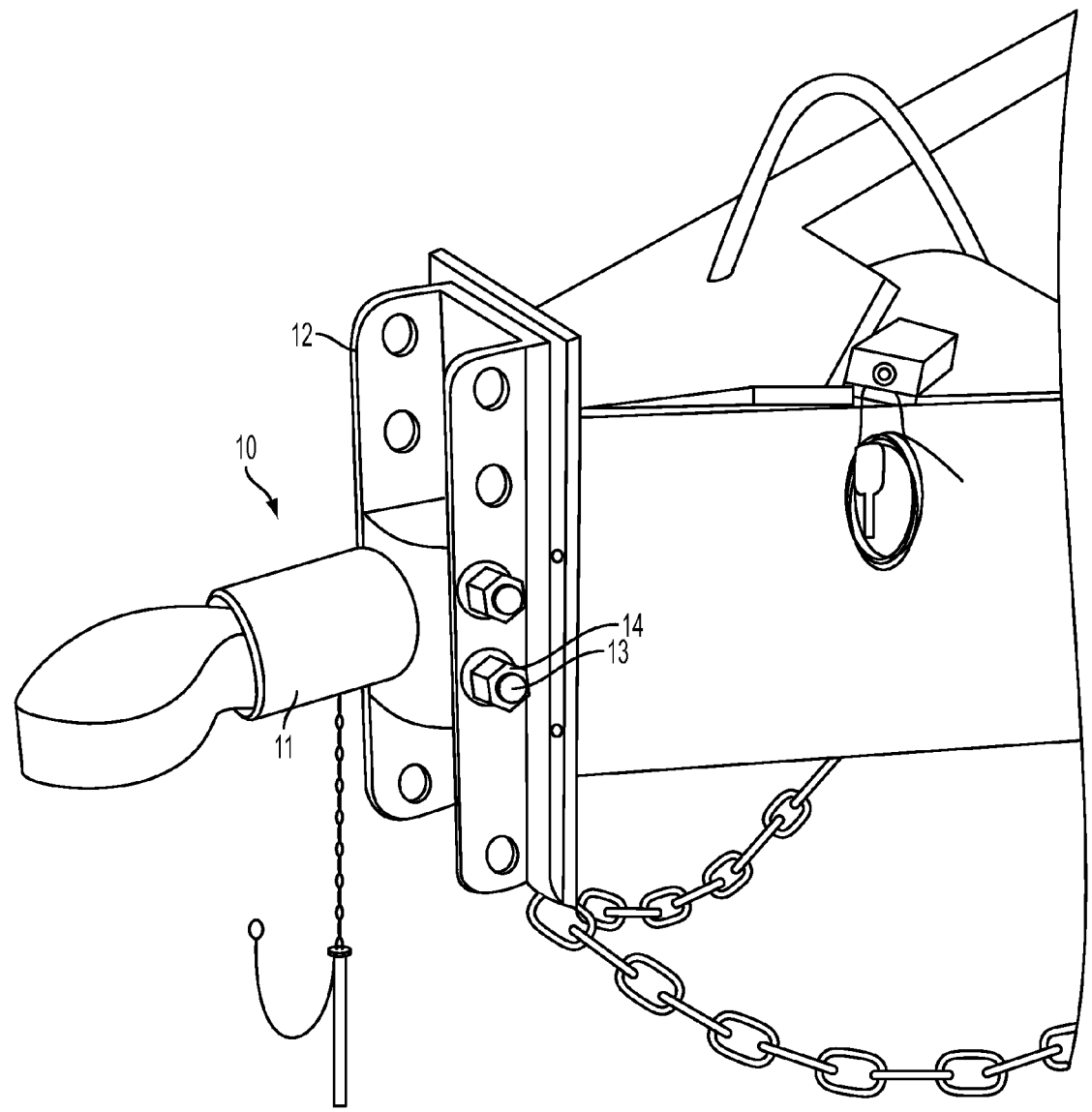
FIG. 1 is a side perspective view of a conventional adjustable trailer hitch assembly.

Referring now to the drawings and in particular FIG. 1, a conventional adjustable trailer hitch assembly 10 is shown as a conventional trailer connection 11 attached to a channel style adjustable trailer hitch mount 12. In conventional adjustable trailer hitch assemblies 10, it is understood that the trailer connection 11 is attached to hitch mount 12 by passing a bolt fastener through holes on both the trailer connection 11 and the hitch mount 12, with such holes aligned to enable the bolt fastener to pass through from the distal side of the assembly to the proximal side thereof, and securing the bolt fastener in place with a locking fastener. In such arrangements, conventional straight bolts and U-bolts are commonly used for bolt fasteners, while threaded locking nuts and castellated nuts with cotter pins are commonly used for locking fasteners.

As shown in FIG. 1, the trailer connection 11 is defined as a ball mount and is attached to the hitch mount 12 through a two bolt fasteners 13 (embodied as either a U-bolt or two straight bolts). The ends of the bolt fastener 13 are secured with a threaded locking nut 14. But because the locking nuts 14 remain exposed, the entire fastening system remains vulnerable to being tampered with or stolen. Indeed, this conventional adjustable trailer hitch assembly 10 provides no protection from a passerby or anyone simply un-bolting the trailer connection 11 and attach it to their own hitch mount.

Referring now to FIGS. 2A, 2B, 3A and 3B, an adjustable trailer hitch assembly having an adjustable trailer hitch mount 100 with an adjustable trailer hitch security apparatus 110 enables a user to selectively cover the side holes of the hitch mount 101, thereby preventing unauthorized access to the fastening system used to secure a trailer connection (not shown) thereto. The adjustable trailer hitch mount 100 is shown as a channel style hitch mount with two vehicle mount holes 102. The adjustable trailer hitch security apparatus 110 is shown having a moving cover portion 111 connected to a fixed attachment portion 112. The cover portion 111 is defined by a rectangular box shaped, hollow housing having an open elongated side opposite an elongated side wall 113 and an open bottom side opposite an top side wall 114. The attachment portion 112 is defined by a rectangular plate body having a top lip 115 and a bottom lip 116, with a plurality of attachment apertures 117 in its body. The cover portion 111 and the attachment portion 112 are sized such that when the cover portion 111 is positioned against the attachment portion 112 with its open elongated side facing the plate body and the open bottom side contacting the bottom lip 116, a rectangular enclosure is formed with the plate body covering the open elongated side and the bottom lip covering the open bottom side. Such a rectangular enclosure forms the structure in which the adjustable trailer hitch security apparatus 110 secures the fastening system of an adjustable trailer hitch assembly, thereby restricting access thereto.

In the preferred embodiment, the cover portion 111 is movably connected to the attachment portion 112 through a hinge joint 118. The hinge joint 118 is disposed on the edge of the bottom lip 114 of the attachment portion 112 and at the bottom of the elongated side wall 113 of the cover portion 111, connecting the bottom lip 114 and the elongated side wall 114 and providing a fixed axis through which the cover portion 111 can be rotated relative to the attachment portion 112.

Figure 2A:
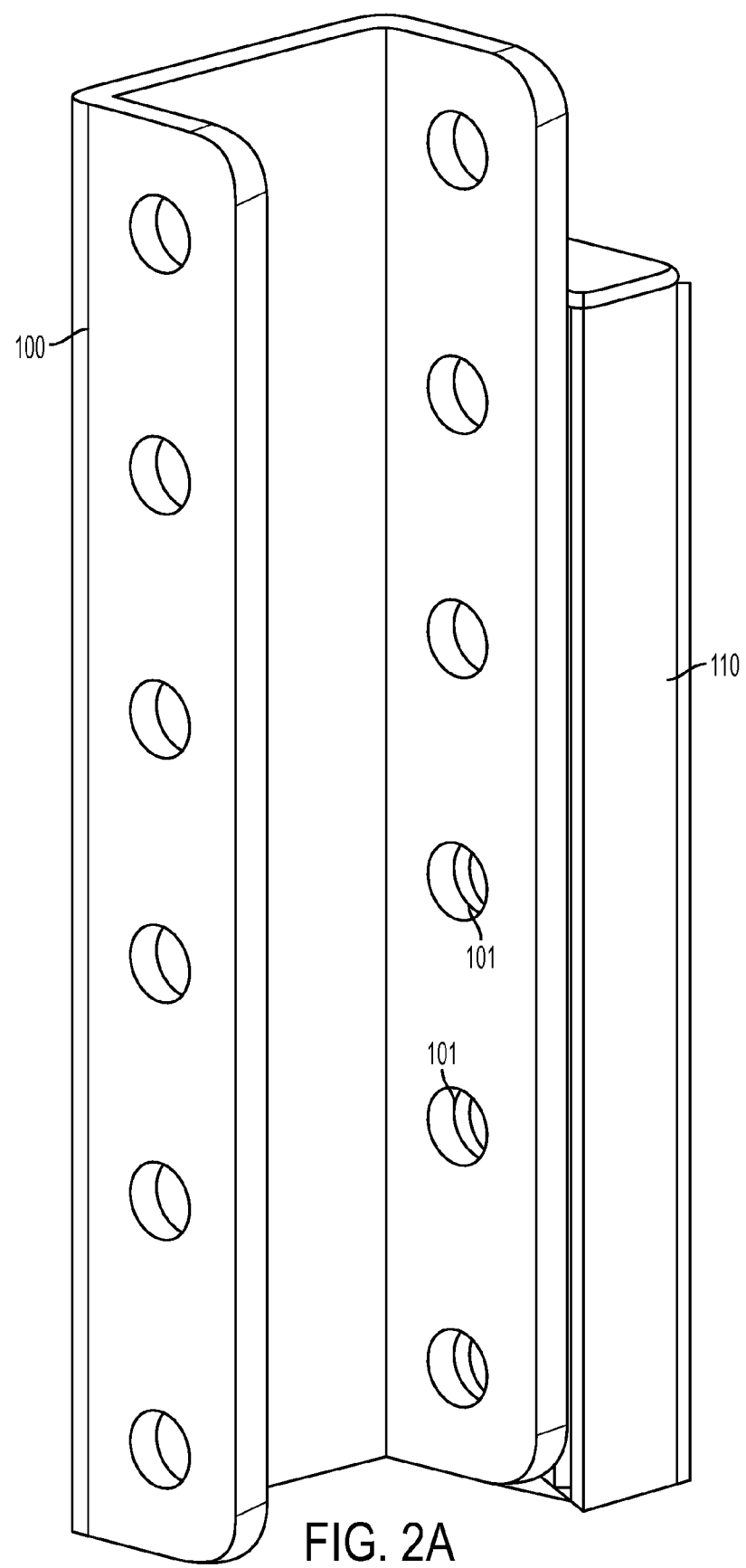
FIG. 2A is a back perspective view of an adjustable trailer hitch security apparatus attached to the far side of an adjustable trailer hitch mount in accordance with the present invention and in the closed position.
Figure 2B:
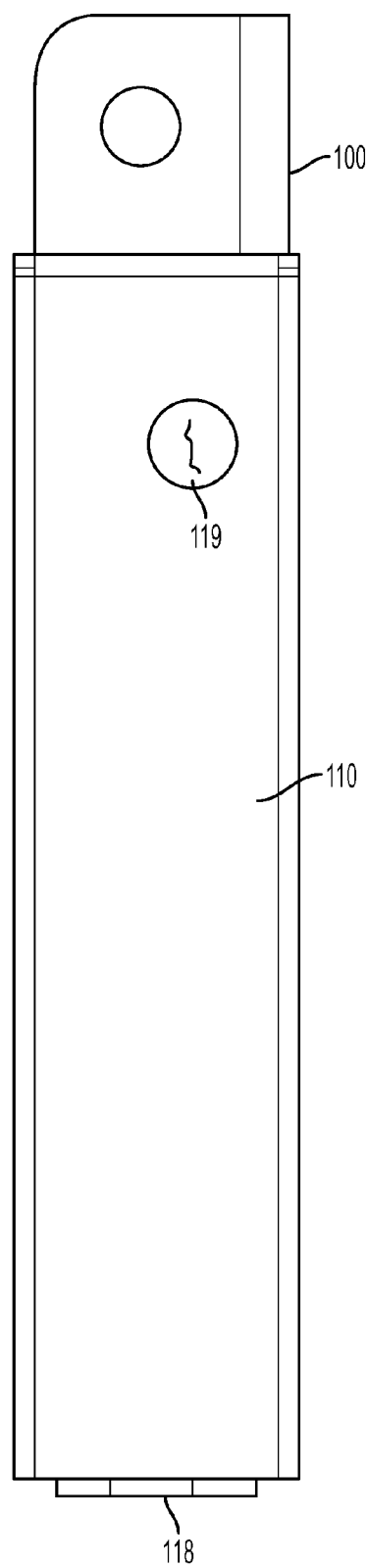
FIG. 2B is a side elevational view of an adjustable trailer hitch security apparatus attached to the near side of an adjustable trailer hitch mount in accordance with the present invention and in the closed position.
Figure 3A:
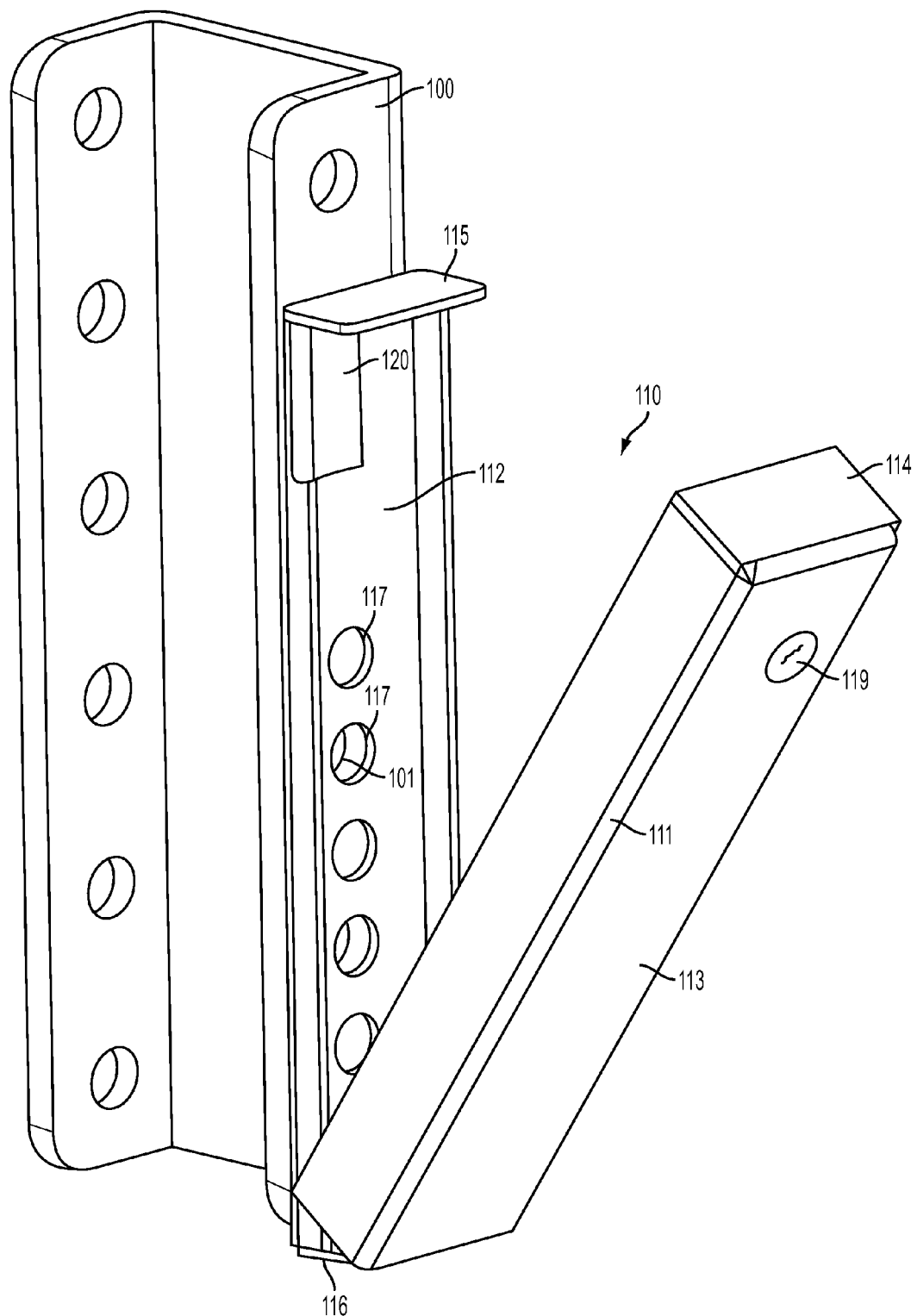
FIG. 3A is a front perspective view of an adjustable trailer hitch security apparatus attached to the near side of an adjustable trailer hitch mount in accordance with the present invention and in the open position.
Figure 3B:
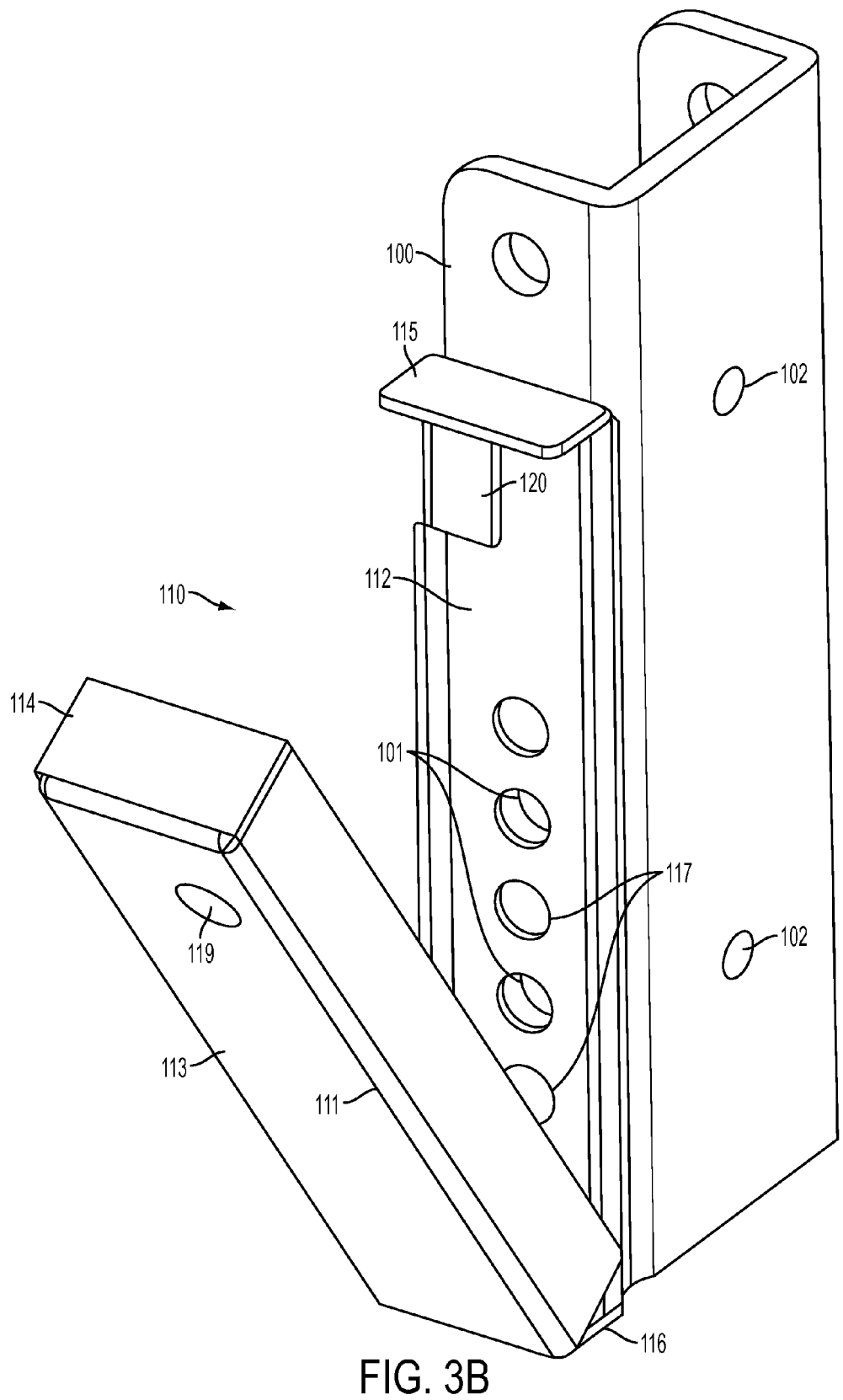
FIG. 3B is a front perspective view of an adjustable trailer hitch security apparatus attached to the near side of an adjustable trailer hitch mount in accordance with the present invention and in the open position.
Figure 4A:
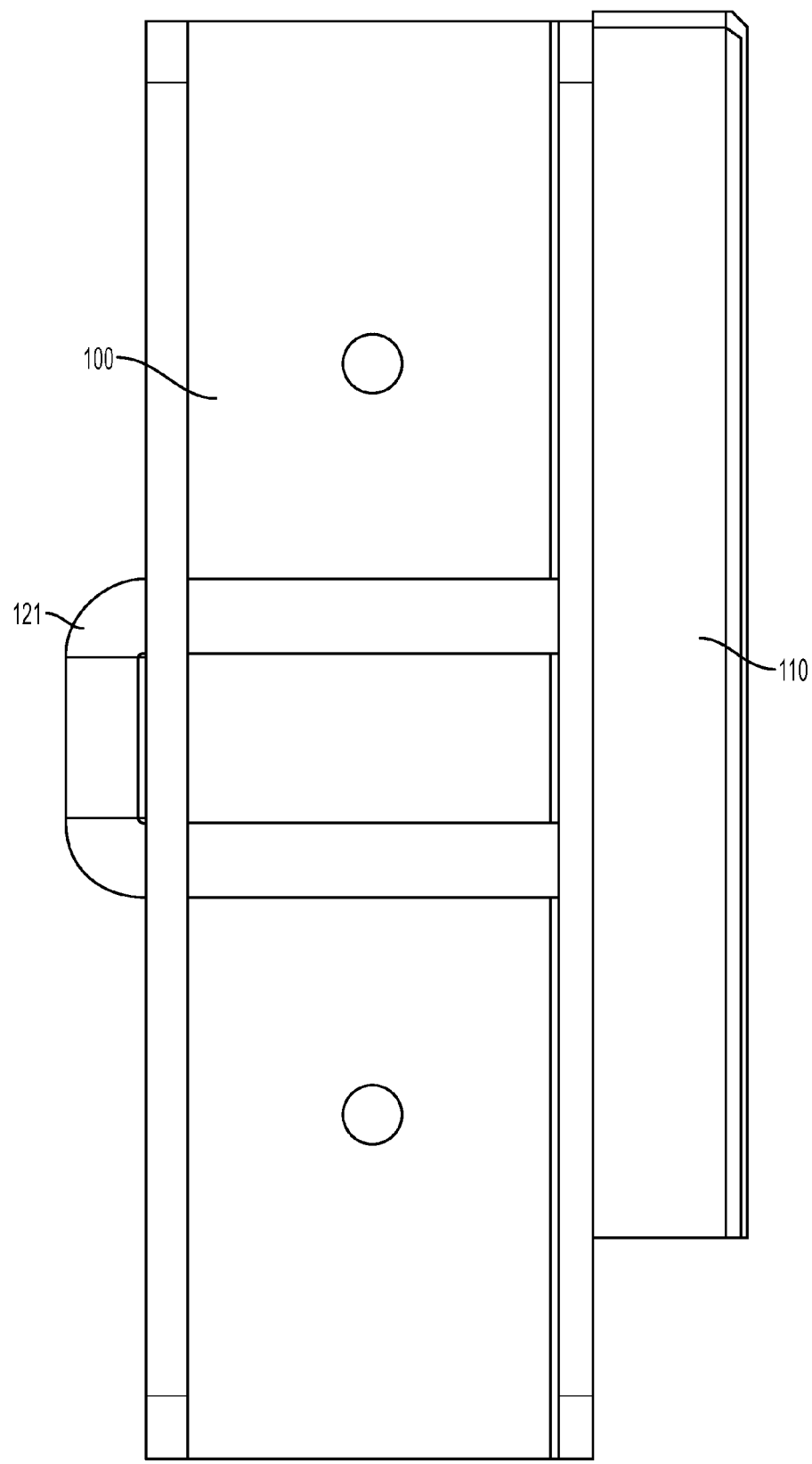
FIG. 4A is a side elevational view of an adjustable trailer hitch security apparatus attached to an adjustable trailer hitch mount in accordance with the present invention and in the closed position.
Figure 4B:
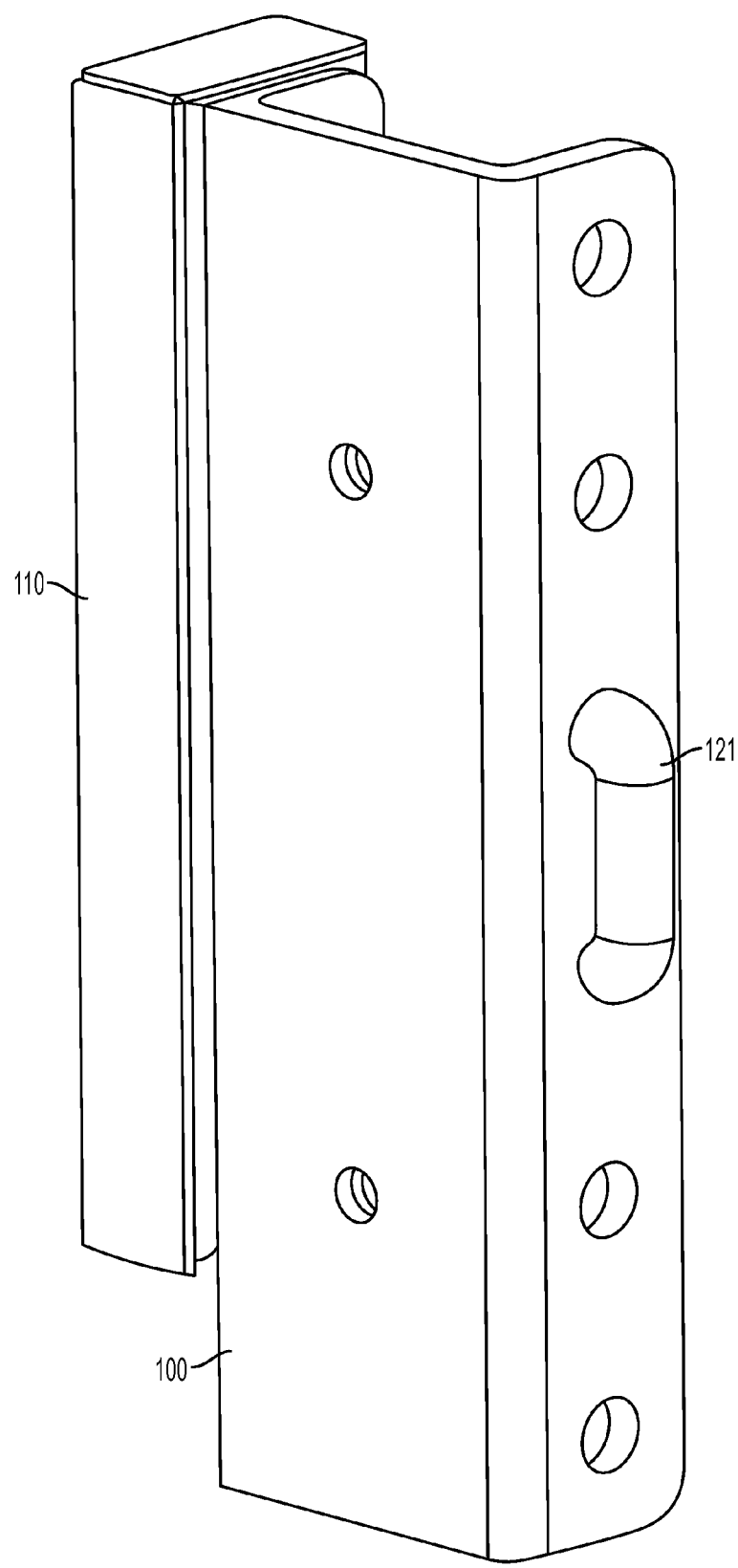
FIG. 4B is a side perspective view of an adjustable trailer hitch security apparatus attached to the far side of an adjustable trailer hitch mount in accordance with the present invention and in the closed position.
Figure 4C:
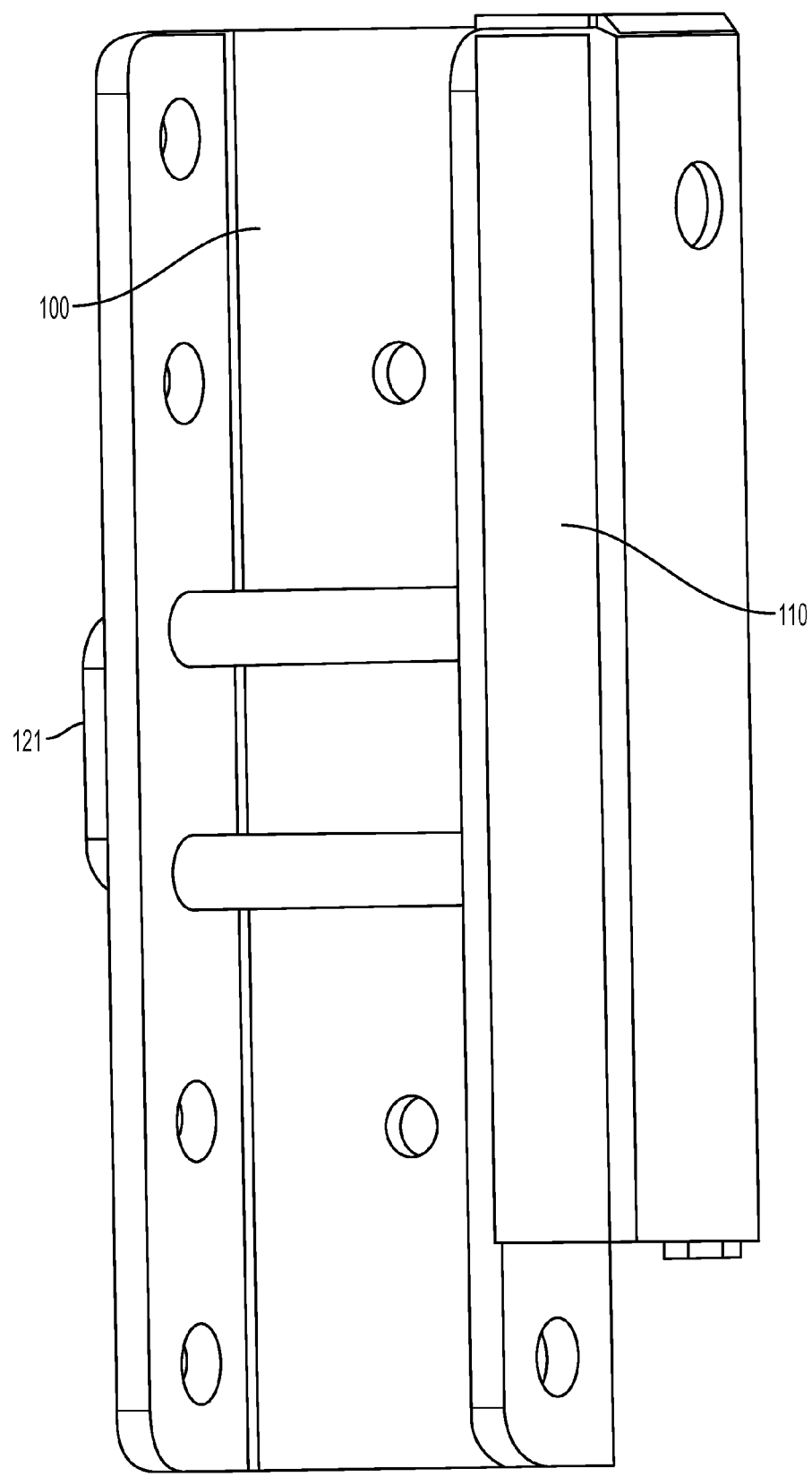
FIG. 4C is a side perspective view of an adjustable trailer hitch security apparatus attached to the near side of an adjustable trailer hitch mount in accordance with the present invention and in the closed position.
Figure 5A:
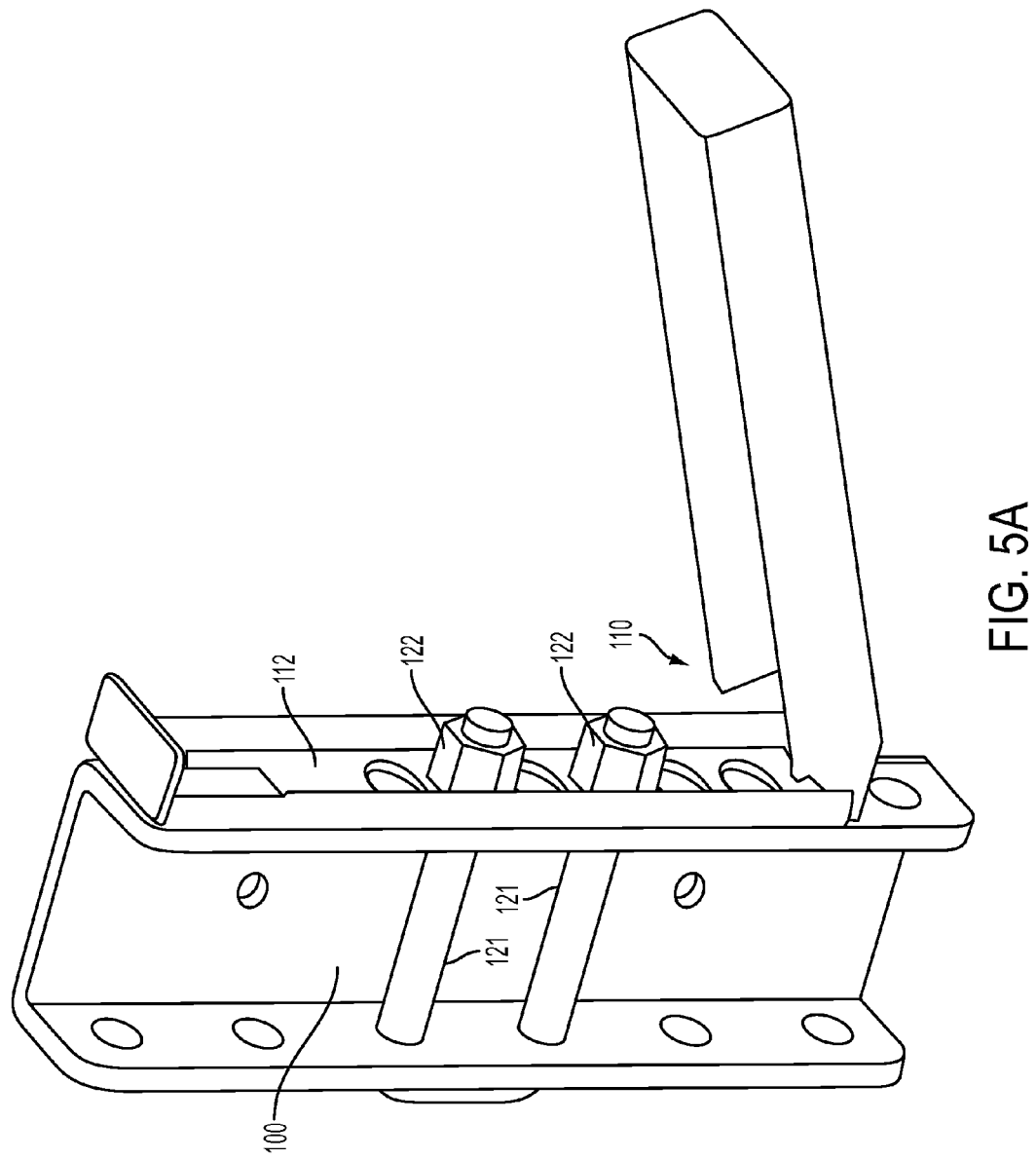
FIG. 5A is a side perspective view of an adjustable trailer hitch security apparatus attached to the near side of an adjustable trailer hitch mount in accordance with the present invention and in the open position.
Figure 5B:
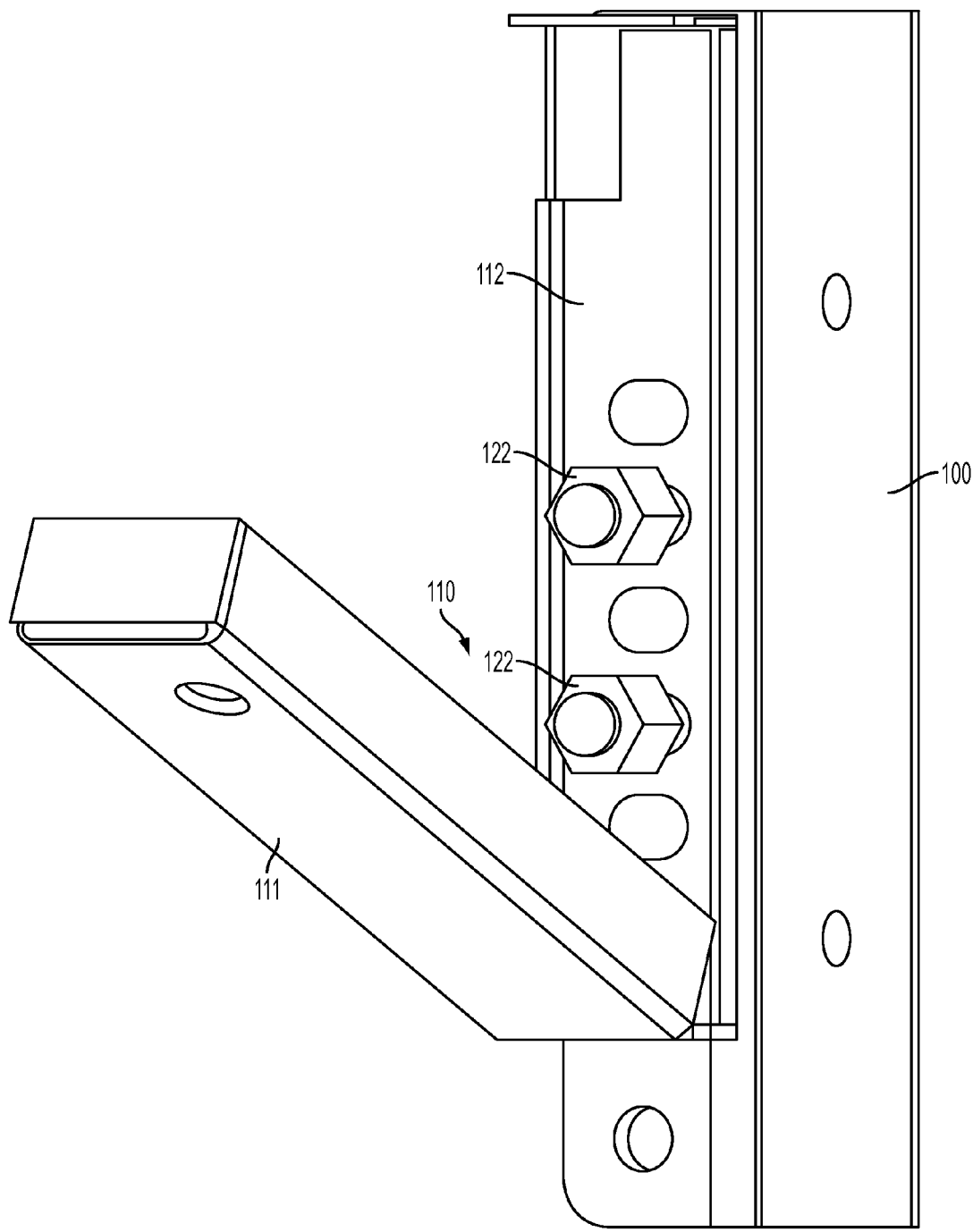
FIG. 5B is a front perspective view of an adjustable trailer hitch security apparatus attached to the near side of an adjustable trailer hitch mount in accordance with the present invention and in the open position.

Through the rotation enabled by the hinge joint, the cover portion 111 can be moved into a closed position relative to the attachment portion 112 and into an open position relative to the attachment portion 112. The closed position, as illustrated in FIGS. 2A and 2B, is defined by the cover portion 111 positioned against the attachment portion 112, forming a rectangular enclosure wherein the bottom lip 116 covers the open bottom side, the plate body covering the open elongated side, and the top lip 115 is adjacent to the top side wall 114. The open position, as exemplified by FIGS. 3A and 3B, is defined by the cover portion 111 being moved out of the closed position to expose the plate body of the attachment portion 112 and the and attachment apertures 117 therein.

In alternate embodiment, the cover portion 111 is configured to move relative to the vertically attachment portion 112 by sliding. In such an embodiment, the attachment portion 112 and the cover portion 111 include a plurality of tracks on which the cover portion 111 slides and the cover portion 111 is moved to an open position by sliding it vertically up to expose the plate body of the attachment portion 112 and the and attachment apertures 117 therein.

The attachment apertures 117 allow the adjustable trailer hitch security apparatus 110 to be attached to the side of a target conventional adjustable trailer hitch mount 100 that utilizes a bolt based fastening system that is secured on the side of the hitch mount, such as a channel style adjustable hitch mount. In channel style hitch mounts, a plurality of vertically spaced holes allow a trailer connection to be moved to one of a plurality of vertical positions at a given time and secured in that position, thereby accounting for different sized trailers. As such, the plate body of the attachment portion 112 includes a plurality of attachment apertures 117, enabling it to be positioned on the side of the target adjustable trailer hitch mount 100, with the attachment apertures 117 aligned with the particular hitch mount holes 101 intended to be used to mount the trailer connection to the target adjustable trailer hitch mount 100. As will be discussed in more detail below, by aligning the attachment apertures 117 in this manner, the attachment portion 112 can be fastened to the side of the target adjustable trailer hitch mount 100 without the need of additional equipment because the bolt fasteners (not shown) that are passed through the particular hitch mount holes 101 to secure the trailer connection can simply be additionally passed through the attachment apertures 117 aligned with the particular hitch mount holes 101 as well. In this regard, it is contemplated that the attachment portion 112 may be attached in this manner to the target adjustable trailer hitch mount 100 on the side the bolts exit, on the side the bolts enter, or both (whether successive bolts are arranged to enter and exit from the same side or to alternate sides on which they enter and exit).

A locking system 119 is used to selectively lock the cover portion 111 to the attachment portion 112 when in the closed position. In the preferred embodiment, the locking system 119 is defined as a conventional mechanical lock, embodied as a cylinder lock (with corresponding key), integrated into the cover portion 111 such that, when the cover portion 111 is in the closed position, its locking bolt mechanism is captured by a receiving channel 120 integrated into the attachment portion 112. In alternate embodiments, the locking system defines a link or a ring integrated into the attachment portion 112 that is accessible from the exterior of the cover portion 111 when in the closed position, enabling it to receive a padlock. In other alternate embodiments, the locking system 119 define aligned apertures in the top side wall and the top lip that receive a padlock of an aligned aperture in the top side wall and the top lip that house a cylinder lock.

Referring now to FIGS. 4A, 4B, 4C, 5A and 5B the adjustable trailer hitch security apparatus 110 is shown attached to the adjustable trailer hitch mount 100 through a conventional square shaped U-bolt 121. Arranged as shown, passing through the body of the adjustable trailer hitch mount 100, it is appreciated that the U-bolt 121 in this configuration would be used along with locking fasteners to form a fastening system that connects a trailer connection, such as a ball mount (not shown), to the adjustable trailer hitch mount 100. As opposed to such conventional set ups, however, when the adjustable trailer hitch security apparatus 110 is employed to restrict access to the components of the fastening system on a side of the adjustable trailer hitch mount 100, the ends of the bolt fasteners, shown as the U-bolts 121, are additionally passed through the aligned attachment apertures of the attachment portion 112 and the locking fasteners, shown as nylon locking nuts 122 are fastened to the ends of the U-bolt 121 on the side of the attachment portion 112 opposite the adjustable trailer hitch mount 100. Thus, when the cover portion 111 is moved into the closed position, the locking nuts 122 are covered. Furthermore, when the locking system of the adjustable trailer hitch security apparatus 110 engaged to lock the cover portion 111 in the closed position the locking nuts 122 are rendered inaccessible to anyone lacking the key or token to disengage the locking system.

It is appreciated that alternate locking fasteners, such as castellated nuts with cotter pins or cotter pins alone (used with bolts having corresponding holes), may be employed in place of locking nuts and thus secured inside the adjustable trailer hitch security apparatus. Such may be advantageous if conventional straight bolts are used and left uncovered so that if one seeking unauthorized access turned the bolts, the locking fastener would not come off.

Although U-bolts are generally desirable because they prevent the bolts from being turned on the side opposite the locking fasteners in order to loosen or remove the locking fasteners, it is additionally appreciated that alternate bolt fasteners, such as any number of conventional straight bolts, may be employed in place of or with a U-bolt. It is contemplated that the determination of which bolt fasteners and locking fasteners to employ will generally by dictated by the adjustable trailer hitch mount and the desired trailer attachment as the elongated body and plurality of attachment apertures of the adjustable trailer hitch security apparatus configure it to be used in substantially all conventional arrangements.

In one embodiment, the adjustable trailer hitch security apparatus may be used on the side of the bolt fasteners opposite where the locking fasteners are attached, thereby restricting access to the bolt fasteners and preventing them from being turned on the side opposite the locking fasteners in order to loosen or remove the locking fasteners. Such an embodiment, may be desirable if conventional straight bolts and locking nuts are employed.

In one embodiment, the adjustable trailer hitch security apparatus may be used on both sides of the adjustable trailer hitch mount.

In one embodiment, the adjustable trailer hitch security apparatus may be used with the vehicle mount holes to enhance the security of the attachment of the adjustable trailer hitch mount to the vehicle.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A hitch assembly of a trailer, the hitch assembly comprising:
   a vertically-orientated channel-style hitch mount, the hitch mounting including a vertically-extending row of a plurality of opposingly-spaced horizontally-aligned bolt hole pairs, the hitch mount being fixedly attached to the trailer;
   a trailer connection, the trailer connection having one or more vertically-aligned trailer connection bolt holes;
   a trailer hitch security apparatus, the trailer hitch security apparatus including an attachment portion and a cover portion,
   the attachment portion including a row of vertically-aligned attachment apertures, spacing between the row of vertically aligned attachment apertures being similar to spacing between the vertically extending row of the horizontally-aligned bolt hole pairs,
   the cover portion being movably integrated with said attachment portion, the cover portion having a first position relative to the attachment portion wherein a rectangular enclosure with an enclosed hollow interior is defined when the cover portion is positioned against the attachment portion in the first position;

one or more threaded bolt fasteners, each of the threaded bolt fasteners including a threaded end, each of the bolt fasteners being received through (i) a respective one of the plurality of the opposingly-spaced horizontally-aligned bolt hole pairs, (ii) the one or more vertically aligned trailer connection bolt holes, and (iii) one of the vertically aligned attachment apertures, wherein the threaded end of each of the bolt fasteners is contained within the hollow interior; and one or more threaded locking nuts, the one or more threaded locking nuts being (a) threaded onto the threaded end of the respective one or more threaded bolt fasteners and (b) contained in the hollow interior.

2. The hitch assembly of claim 1, wherein the one or more threaded bolt fasteners comprises two threaded bolt fasteners.

3. The hitch assembly of claim 1, wherein the one or more threaded bolt fasteners comprises a threaded U-bolt fastener.

4. The hitch assembly of claim 1, wherein trailer hitch security apparatus includes a locking system configured to secure the cover portion in the first position.

5. The hitch assembly of claim 1, wherein the cover portion is movably integrated to the attachment portion by way of a hinge.

6. The hitch assembly of claim 1, wherein the cover portion is additionally configured to be selectively placed in a second position relative to the attachment portion wherein the threaded nuts are not enclosed in the hollow interior.

7. A hitch assembly of a trailer, the hitch assembly comprising:

a vertically-orientated channel-style hitch mount, the hitch mounting including a vertically-extending row of a plurality of opposingly-spaced horizontally-aligned bolt hole pairs, the hitch mount being fixedly attached to the trailer;

a trailer connection, the trailer connection having one or more vertically-aligned trailer connection bolt holes;

a trailer hitch security apparatus, the trailer hitch security apparatus including an attachment portion, a cover portion and mechanical lock, the attachment portion includes (i) an elongated plate body having a top attachment end, a bottom attachment end and a linear row of uniformly-spaced vertically-aligned attachment apertures extending there through, (ii) a top lip extending orthogonally from the top attachment end, (iii) a bottom lip extending orthogonally from the bottom attachment end and having a distal end, and (iv) a receiving channel; and a cover portion, the cover portion defining an elongated rectangular box hollow housing having (a) an elongated cover side having left, right, top and bottom cover ends, (b) a left cover side extending orthogonally from the left cover end, (c) a right cover side extending orthogonally from the right cover end, (d) a top cover side extending orthogonally from the top cover end, (e) a first open side opposite the elongated cover side, and (f) a second open side proximate the bottom cover end and opposite the top cover end, the cover portion being connected to the attachment portion by way of a hinge located at the bottom cover end and the distal end of the bottom lip, the cover portion being configured to be received over the attachment portion with the elongated plate body occupying the space of the first open side and the bottom lip occupying the space of the second open side to create an enclosed interior space, a mechanical lock, the mechanical lock being attached to the cover portion and having (1) a locked position wherein the mechanical lock interfaces with the receiving channel to prevent the cover portion from being rotated away from the attachment portion about the hinge, and (2) an open position wherein the cover portion can be rotated about the hinge away from the attachment portion;

one or more threaded bolt fasteners, each of the threaded bolt fasteners including a threaded end, each of the bolt fasteners being received through (A) a respective one of the plurality of the opposingly-spaced horizontally-aligned bolt hole pairs, (B) the one or more vertically aligned trailer connection bolt holes, and (C) one of the vertically aligned attachment apertures, wherein the threaded end of each of the bolt fasteners is contained within the enclosed interior space; and one or more threaded locking nuts, the one or more threaded locking nuts being (a) threaded onto the threaded end of the respective one or more threaded bolt fasteners and (b) contained in the enclosed interior space.

8. The hitch assembly of claim 7, wherein the one or more threaded bolt fasteners comprises a threaded U-bolt fastener.

* * * * *